United States Patent [19]

Lala et al.

[11] Patent Number: 4,641,814
[45] Date of Patent: Feb. 10, 1987

[54] ON-VEHICLE SPRING COMPRESSOR TOOL

[75] Inventors: Sharookh Lala, Centerville, Ohio; Patrick Lehnerer, Wheaton, Ill.; Russell Hanson, Cary, Ill.; Michael Stevens, Lisle, Ill.

[73] Assignee: Maremont Corporation, Carol Stream, Ill.

[21] Appl. No.: 650,762

[22] Filed: Sep. 12, 1984

[51] Int. Cl.$^4$ ............................................. B60P 1/00
[52] U.S. Cl. ...................................... 254/10.5; 29/227
[58] Field of Search ................. 254/10.5; 29/215–218, 29/225–227; 264/257

[56] References Cited

U.S. PATENT DOCUMENTS

| Re. 25,874 | 10/1965 | Castoe . |
| 1,051,633 | 1/1913 | Price . |
| 1,342,529 | 6/1920 | Charland . |
| 1,400,463 | 12/1921 | Sandefur . |
| 1,451,715 | 4/1923 | Seppmann . |
| 1,614,301 | 1/1927 | Hobbs . |
| 1,651,998 | 12/1927 | Clerico . |
| 2,234,819 | 3/1941 | Butcher . |
| 2,316,646 | 4/1943 | Berkman . |
| 2,387,839 | 10/1945 | Frost . |
| 2,948,057 | 8/1960 | Dagenais . |
| 2,990,738 | 7/1961 | Zysset .................................. 269/257 |
| 3,051,443 | 8/1962 | Castoe . |
| 3,132,843 | 5/1964 | Brocato .............................. 254/10.5 |
| 3,216,098 | 11/1965 | Ratz . |
| 3,237,919 | 3/1966 | MacKay .............................. 254/10.5 |
| 3,278,157 | 10/1966 | Smyser . |
| 3,341,175 | 9/1967 | Branick . |
| 3,504,419 | 4/1970 | Bozsanyi . |
| 3,764,107 | 10/1973 | Mlynarczyk . |
| 3,814,382 | 6/1974 | Castoe . |
| 3,883,116 | 5/1975 | Buccino . |
| 3,902,698 | 9/1975 | Furrer et al. . |
| 3,912,224 | 10/1975 | Castoe . |
| 3,936,921 | 2/1976 | Ross . |
| 3,982,730 | 9/1976 | Otsuka . |
| 4,009,867 | 3/1977 | Diffenderfer . |
| 4,034,960 | 7/1977 | Kloster . |
| 4,036,473 | 7/1977 | Kloster . |
| 4,105,188 | 8/1978 | Mendoza et al. . |
| 4,219,918 | 9/1980 | Klann . |

FOREIGN PATENT DOCUMENTS 1348906  3/1974  United Kingdom .

OTHER PUBLICATIONS

Sales Brochure of QMA, Inc., no date.
Sales Brochure of Applied Power, Inc., no date.
Sales Brochure of Gabriel, no date.

*Primary Examiner*—Robert C. Watson
*Attorney, Agent, or Firm*—Allegretti, Newitt, Witcoff & McAndrews, Ltd.

[57] ABSTRACT

A spring coil compressor tool capable of compressing an automobile spring while it is operatively mounted on the vehicle is disclosed. The inventive spring coil compressor tool includes elongated hook means on the upper spring coil engagement means that allow the safe compression of the spring coil despite the obstruction of low extending fender walls.

2 Claims, 6 Drawing Figures

ON-VEHICLE SPRING COMPRESSOR TOOL

BACKGROUND OF THE INVENTION

1. Field of the Invention

The present invention relates to a tool for compressing suspension springs used on motor vehicles.

2. Description of the Prior Art

Many spring compressor tools are known in the prior art for compressing suspension springs used on motor vehicles so that the springs can be removed and replaced during servicing of the vehicle's suspension system. Examples of such known spring compressor tools are described in the following patents: U.S. Pat. No. Re. 25,874 (Castoe); U.S. Pat. Nos. 4,219,918 (Klann); 4,105,188 (Mendoza et al.); 4,036,473 (Kloster); 4,034,960 (Kloster); 4,009,867 (Diffenderfer); 3,982,730 (Otsuka); 3,936,921 (Ross); 3,912,224 (Castoe); 3,902,698 (Furrer et al.); 3,883,116 (Buccino); 3,814,382 (Castoe); 3,764,107 (Mlynarczyk); 3,504,419 (Bozsanyi); 3,341,175 (Branick); 3,278,157 (Smyser); 3,216,098 (Ratz); 3,051,443 (Castoe); 2,948,057 (Dagenais); 2,387,839 (Frost); 2,316,646 (Berkman); 2,234,819 (Butcher); 1,651,998 (Clerico); 1,614,301 (Hobbs); 1,451,715 (Seppmann); 1,400,463 (Sandefur); 1,342,529 (Charland); and 1,051,633 (Price); United Kingdom Patent Specification No. 1,348,906 (Townsend et al.); and West German Patent No. 298,330 (Bussing). In addition, prior art spring compressor tools are shown in the sales brochures of QMA, Inc., Applied Power, Inc., and Gabriel.

Many of the above noted prior art spring compressor tools are not capable of achieving sufficient compression of the spring while the spring is mounted on the vehicle. In certain late model automobiles, most notably the Ford Escort, this problem is compounded by the presence of low extending fender walls that impede access of conventional spring compressor tools to the spring as it is mounted on the vehicle. In certain cases, the prior art spring compressor tools are not capable of engaging the spring to any extent at all while the spring is mounted on the vehicle. In other cases, though the prior art spring compressor tools can engage a limited number of the coils of the spring while it is on the vehicle, compression of this limited number of coils does not compress the spring to a sufficient degree to allow for its safe removal as required by the automobile manufacturer's safety specifications. In either case, the entire strut assembly must be unbolted and removed from the vehicle before the spring can be compressed. This is a cumbersome and time-consuming process. Thus, there is a need for an on-vehicle spring compressor tool capable of quickly and safely compressing the suspension spring while mounted on the vehicle despite limited access caused by a low reaching fender wall.

SUMMARY OF THE INVENTION

It is an object of the present invention to provide an on-vehicle spring compressor tool capable of engaging a sufficient number of spring coils such that the suspension spring may be compressed to a sufficient degree to allow its safe removal from an automobile despite limited access caused by a low reaching fender wall.

It is a further object of the present invention to provide a surface-to-surface contact between the spring engagement means and the surface of the spring coils such that the maximum degree of contact is obtained between the on-vehicle spring compressor tool and the spring being compressed.

It is a specific object of the present invention to provide a spring compressor tool for compressing a motor vehicle spring while said spring is operably mounted on said vehicle in combination with a lower spring seat and a strut. The spring compressor tool includes upper spring coil engagement means and lower spring engagement means. The lower spring engagement means includes laterally extending arms attached to a fixed vertical cylinder and may advantageously additionally comprise a horseshoe bracket, a clamp bracket, or a pair of vertically extending hook means. The horseshoe bracket is adapted to engage the undersurface of the lower spring seat, the clamp bracket is designed to engage the strut and the lower vertical hook means is designed to securely engage one or more of the lower coils of the spring.

The upper spring coil engagement means is attached to a movable vertical cylinder and comprises a pair of laterally extending arms, each of the arms having vertically extending hook means attached thereto. The hook means are elongated to facilitate the engagement of the upper spring coils despite any obstruction caused by a low reaching fender wall. Specifically, the elongated hook means are capable of vertically extending from the laterally extending arms of the upper spring coil engagement means by at least three spring coil distances, a spring coil distance being equal to the distance between adjacent spring coils when the spring is in its mounted state. This construction allows at least one of the upper spring coils of the spring to be engaged by the extending hook means.

The two vertical cylinders are in a vertical telescoping relationship such that application of a vertical force to the movable cylinder vertically moves the upper spring coil engagement means relative to the lower spring engagement means thereby compressing or relaxing the spring. The cylinders may be moved with respect to each other by hand, by a screw drive, by pneumatic means, or by a power operated hydraulic unit. The vertical extension of the elongated hook means insures that almost all of the spring coils of the spring can be compressed while the spring is operatively mounted on the vehicle. Since more coils are capable of being compressed, the spring may be removed and serviced with greater safety and in accordance with automobile manufacturer's specifications.

In a preferred embodiment of the present invention, the elongated hook means are pivotably mounted on the upper laterally extending arms. This pivotal mounting, in combination with the elongated hook means, allows the on-vehicle spring compressor tool of the present invention to be easily positioned relative to the operatively mounted spring and also allows the elongated hook means to easily engage the upper coils of the spring.

Further objects and embodiments of the present invention will be made clear in the following description of the preferred embodiments and claims.

DESCRIPTION OF THE PREFERRED EMBODIMENTS

Figure 1:
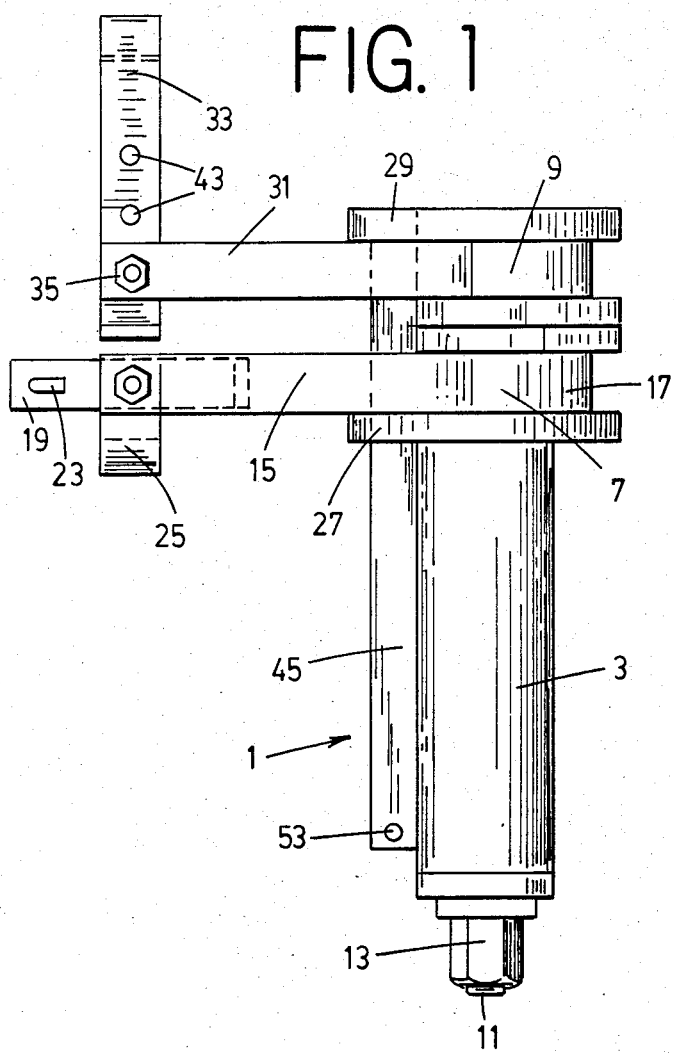
FIG. 1 is a side view of the on-vehicle spring compressor tool of the present invention displaying both the horseshoe bracket and the lower hook means of the lower spring engagement means.
Figure 2:
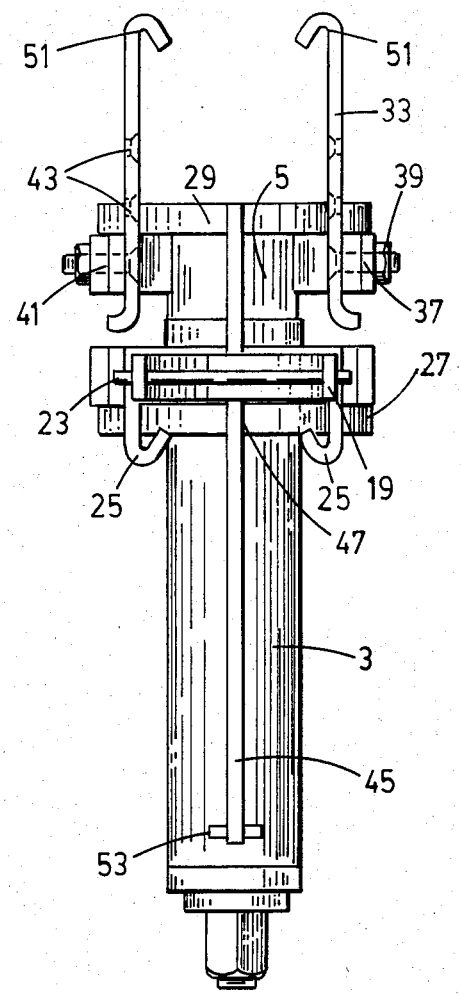
FIG. 2 is a front view of the on-vehicle spring compressor tool of FIG. 1.
Figure 3:
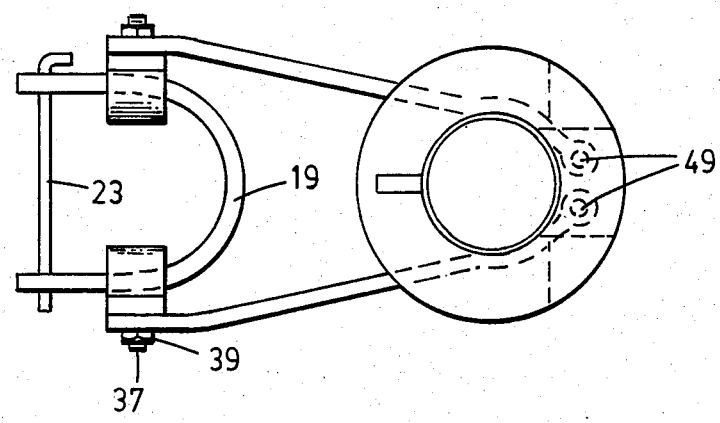
FIG. 3 is a top view of the present invention displaying only the horseshoe bracket of the lower spring engagement means.

Referring to FIGS. 1 and 2, the preferred on-vehicle spring compressor tool 1 of the present invention includes two vertical cylinders 3 and 5 that are in a vertical telescoping relationship with each other. Cylinder 3 is the fixed vertical cylinder to which the lower spring coil engagement means 7 are attached. Cylinder 5 is a movable vertical cylinder to which the upper spring coil engagement means 9 are attached. The movable vertical cylinder 5 may be vertically moved with respect to the fixed vertical cylinder 3 by application of a force to the piston rod 11 that extends through the interior of both vertical cylinders 3 and 5 and is attached to movable cylinder 5. Piston rod 11 is threaded over its entire length and is permanently welded at its lowermost end to nut 13. The upper threaded end of piston rod 11 threadedly engages a female threaded interior portion 14 (not shown) of movable vertical cylinder 5. Thus, nut 13 may be rotated, either by hand or by a hydraulic or pneumatic unit (not shown), such that the movable vertical cylinder 5 moves vertically with respect to the piston rod 11 and the fixed vertical cylinder 3. This relative movement moves the upper spring coil engagement means 9 and the lower spring engagement means 7 closer together or further apart depending upon the direction of rotation of nut 13.

The lower spring engagement means 7 comprises two laterally extending arms 15 that are attached to the fixed vertical cylinder 3 via two pivot points 17 adjacent the fixed vertical cylinder 3. This allows the laterally extending arms 15 to be pivoted in a plane transverse to the axis formed by the vertical cylinders 3 and 5. This pivoting action allows the laterally extending arms 15 to be properly positioned with respect to the width of the spring to be compressed.

Attached to the ends of the laterally extending arms 15 is a horseshoe bracket 19 or lower hook means 25 or a clamp bracket 55. The bracket 19, hook means 25, and clamp bracket 55 are intended to be used individually and not together, though both the horseshoe bracket 19 and lower hook means 25 are displayed in FIGS. 1 and 2. The horseshoe bracket 19 includes a hole in each of its extending arms that accept a locking pin 23. In its operative state, and horseshoe bracket 19 is positioned to contact the under surface of the spring seat, which is directly below and adjacent the lowermost coil of the spring. The horseshoe bracket thus acts to hold the fixed cylinder 3 in a fixed position relative to the spring seat and lowermost coil of the spring. The locking pin 23 is operatively positioned on the opposite side of the strut from the cylinders 3 and 5 and acts to prevent the strut from slipping out of engagement with the horseshoe bracket 19.

The two lower vertically extending hook means 25, which may be used optionally in place of the horseshoe bracket 19, are capable of grasping the lower coils of the spring to be compressed. When the lower coils of the spring are properly positioned in the hook means 25, the lower coils of the spring are prevented from moving downward during the compression and relaxation steps.

Figure 4:
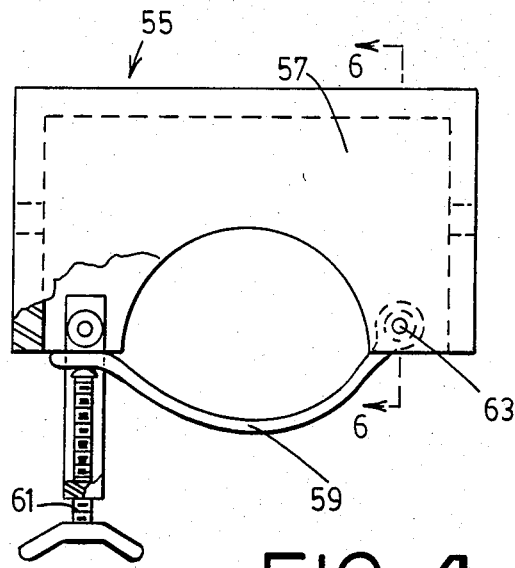
FIG. 4 is a top view of the clamp bracket.
Figure 6:
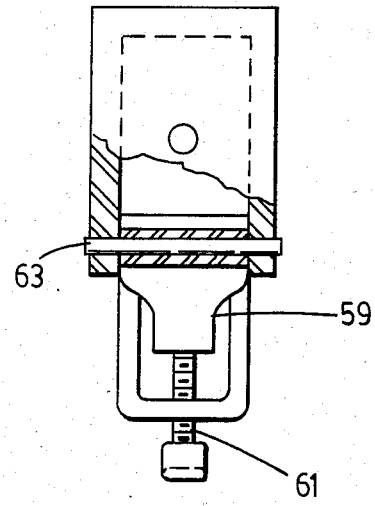
FIG. 6 is a front view of the clamp bracket.
Figure 5:
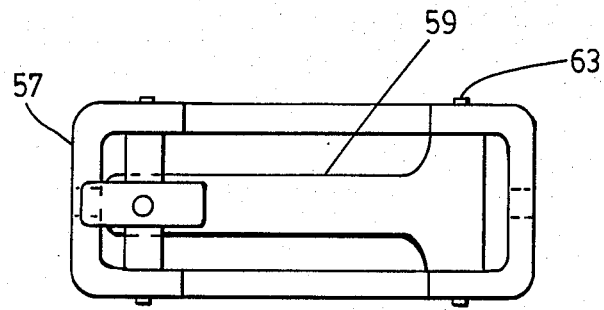
FIG. 5 is a side view of the clamp bracket.

A third option to the horseshoe bracket 19 and lower hook means 25 is the clamp bracket 55 shown in FIGS. 4 and 5. The clamp bracket 55 includes a U-shaped bracket 57 to which a hinged clamp 59 and a screw member 61 are attached. The clamp 59 is capable of pivoting relative to the U-shaped bracket 57 about pivot 63 to accept and close on the strut. The clamp 59 and screw member 61 then threadedly cooperate to firmly engage the strut, thereby fixing the vertical cylinder 3 relative to the strut and the lowermost coils of the spring.

Most advantageously, the horseshoe bracket 19, lower hook means 25, or clamp bracket 55 are pivotally mounted on the laterally extending arms 15. In combination with the pivotally mounted elongated hook means 33, the pivot action of the lower spring engagement means 7 allows the spring and compressor tool assembly to be pivoted relative to the lower spring seat in order to properly align the spring during installation and removal.

The lower spring engagement means 7 is kept in transverse relationship to the axis formed by the vertical cylinders 3 and 5 by means of flange 27. In similar fashion, the upper spring coil engagement means 9 are maintained in a transverse relationship to the cylinders 3 and 5 by means of flange 29.

The upper spring coil engagement means 9 include two laterally extending arms 31. Each of these extending arms 31 has a vertically extending, elongated hook means 33 attached to the end of the extending arms 31. These elongated hook means are attached to laterally extending arms 31 by means of pivot points 35. In the preferred embodiment, these pivot points consist of a bolt 37 and a nut 39 that extend through a hole 41 in the upper hook means 33. As can be seen, the upper hook means 33 can be pivoted around their pivot points 35 with respect to the laterally extending arms 31. The elongated upper hook meamns 33 are capable of extending in a vertical direction from the laterally extending arms 31 by at least three spring coil distances, as measured when the spring is in its mounted state. This elongation of the hook means 33 allows the upper hook means 33 to extend up from beneath the bottom of a fender wall to engage more of the upper spring coils, access to which is blocked by the fender wall.

The upper hook means 33 also include additional holes 43 that allow the hook means to be vertically adjusted with respect to the upper or laterally extending arms 31.

The fixed vertical cylinder and movable vertical cylinder 3 and 5 are maintained in a non-rotating alignment by means of guide 45 that is attached to movable vertical cylinder 5, and more particularly to flange 29, and that is vertically engageable with slot 47 in flange 27. Thus, as the vertical cylinders 3 and 5 are moved in telescoping relationship with respect to one another, the guide 45 cooperates with slot 47 to maintain the two cylinders in non-rotating alignment. Guide 45 also includes a steel roll pin 53 or similar device that prevents vertical disengagement of vertical cylinders 3 and 5 by butting up against flange 27, for example, at the point of maximum safe vertical extension. The two upper laterally extending arms 31 are attached to the movable vertical cylinder 5 by means of two pivot points 49. Thus, as with the lower laterally extending arms 15, the upper laterally extending arms 31 can be pivoted in a plane transverse to the axis formed by the vertical cylinders 3 and 5. This allows the upper spring coil engagement means 9 to be conveniently positioned with respect to the upper spring coils of the spring to be compressed.

In a most preferred embodiment of the present invention, the elongated hook means 33 include inner surfaces 51 that are helical in shape such that the inner surfaces 51 engage the upper spring coils of the spring to be compressed in a surface-to-surface manner. Also, the inner surfaces 51 may be protectively coated with a plastic or vinyl coating to insure that the spring coils of the spring will not be damaged during compression or relaxation.

It is to be understood that the above description of the preferred embodiments is not intended to limit the scope of the present invention. Rather, many embodiments not specifically discussed above fall within the spirit of the invention and scope of the claims that follow.

We hereby claim as our invention:

1. In a spring compressor tool for compressing a motor vehicle spring while said spring is operatively mounted on said vehicle in combination with a lower spring seat and a strut, said spring having a plurality of coils having a spring coil distance between adjacent spring coils when said spring is in its operatively mounted state, said tool having an upper spring coil engagement means and a lower spring engagement means, said lower spring engagement means being attached to a fixed vertical cylinder, said upper spring coil engagement means being attached to a movable vertical cylinder, said movable cylinder being in a vertical, telescoping relationship with said fixed cylinder such that application of a vertical force to said movable cylinder vertically moves said upper spring coil engagement means relative to said lower spring engagement means thereby compressing or relaxing said spring, said upper spring coil engagement means including a pair of laterally extending arms, each of said arms having vertically extending hook means attached thereto for engaging at least one spring coil, said lower spring engagement means including a pair of laterally extending arms, the improvement comprising in combination therewith
   at least one of said hook means being elongated such that said elongated hook means is capable of vertically extending from said laterally extending arm to which said elongated hook means is attached by at least three spring coil distances and said lower spring engagement means additionally comprising a horseshoe bracket pivotally mounted on said laterally extending arms for engaging the undersurface of said lower spring seat.

2. In a spring compressor tool for compressing a motor vehicle spring while said spring is operatively mounted on said vehicle in combination with a lower spring seat and a strut, said spring having a plurality of coils having a spring coil distance between adjacent spring coils when said spring is in its operatively mounted state, said tool having an upper spring coil engagement means and a lower spring engagement means, said lower spring engagement means being attached to a fixed vertical cylinder, said upper spring coil engagement means being attached to a movable vertical cylinder, said movable cylinder being in a vertical, telescoping relationship with said fixed cylinder such that application of a vertical force to said movable cylinder vertically moves said upper spring coil engagement means relative to said lower spring engagement means thereby compressing or relaxing said spring, said upper spring coil engagement means including a pair of laterally extending arms, each of said arms having vertically extending hook means attached thereto for engaging at least one spring coil, said lower spring engagement means including a pair of laterally extending arms, the improvement comprising in combination therewith
   at least one of said hook means being elongated such that said elongated hook means is capable of vertically extending from said laterally extending arm to which said elongated hook means is attached by at least three spring coil distances and said lower spring engagement means additionally comprising a clamp bracket pivotally mounted on said laterally extending arms for detachably engaging said strut.

* * * * *